(12) United States Patent
Shahin

(10) Patent No.: US 12,535,112 B2
(45) Date of Patent: Jan. 27, 2026

(54) BRAKE DISK WITH PROTRUSIONS

(71) Applicant: HL MANDO CORPORATION, Pyeongtaek-si (KR)

(72) Inventor: Hatem Shahin, Pfaffenhofen (DE)

(73) Assignee: HL MANDO CORPORATION, Pyeongtaek-si (KR)

( * ) Notice: Subject to any disclaimer, the term of this patent is extended or adjusted under 35 U.S.C. 154(b) by 404 days.

(21) Appl. No.: 18/081,054

(22) Filed: Dec. 14, 2022

(65) Prior Publication Data

US 2023/0184304 A1   Jun. 15, 2023

(30) Foreign Application Priority Data

Dec. 14, 2021   (DE) .......................... 102021214337.7

(51) Int. Cl.
  *F16D 65/12*   (2006.01)
  *F16D 55/225*  (2006.01)
  *F16D 65/02*   (2006.01)

(52) U.S. Cl.
  CPC ......... *F16D 65/127* (2013.01); *F16D 65/125* (2013.01); *F16D 65/128* (2013.01); *F16D 55/225* (2013.01); *F16D 2065/1328* (2013.01); *F16D 2200/0013* (2013.01); *F16D 2200/0039* (2013.01); *F16D 2250/0046* (2013.01)

(58) Field of Classification Search
  CPC .... F16D 65/125; F16D 65/127; F16D 65/128; F16D 55/225; F16D 2065/1328; F16D 2200/0013; F16D 2200/0039; F16D 2250/0046

USPC .................................................. 188/218 XL
See application file for complete search history.

(56) References Cited

U.S. PATENT DOCUMENTS

| | | | | |
|---|---|---|---|---|
| 2,835,355 A | * | 5/1958 | Armstrong | F16D 65/12 188/218 XL |
| 3,695,406 A | * | 10/1972 | Graham | F16D 69/02 188/72.3 |
| 3,887,043 A | * | 6/1975 | Hernick | F16D 69/00 188/73.1 |

(Continued)

FOREIGN PATENT DOCUMENTS

| | | |
|---|---|---|
| DE | 1916757 A1 | 10/1969 |
| DE | 3026354 A1 | 2/1981 |

(Continued)

OTHER PUBLICATIONS

Office Action issued in corresponding German Patent Application No. 10 2021 214 337.7 dated Aug. 24, 2022.

(Continued)

*Primary Examiner* — Christopher P Schwartz
(74) *Attorney, Agent, or Firm* — LEE, HONG, DEGERMAN, KANG & WAIMEY

(57) ABSTRACT

The invention is aimed at solving issues of pad suction and drag torque, which occur during driving in disk brake systems. The invention relates to a brake disk for a disk brake system, having at least one friction surface, which is at least sectionally delimited by at least one protrusion, protruding from the at least one friction surface, at an outer circumferential side and/or at an inner circumferential side of the at least one friction surface. The invention also relates to a brake system having a brake disk of this type.

17 Claims, 28 Drawing Sheets

(56) References Cited

U.S. PATENT DOCUMENTS

| | | | | | |
|---|---|---|---|---|---|
| 4,732,240 | A | * | 3/1988 | Flaim | F16D 65/08 |
| | | | | | 188/250 G |
| 5,398,793 | A | * | 3/1995 | Stephens | F16D 35/005 |
| | | | | | 192/58.4 |
| 6,006,885 | A | * | 12/1999 | Borgeaud | F16D 55/36 |
| | | | | | 192/107 M |
| 11,092,200 | B2 | * | 8/2021 | Siegel | F16D 13/74 |
| 2006/0289255 | A1 | * | 12/2006 | Adams | F16D 65/0971 |
| | | | | | 188/218 XL |
| 2019/0360541 | A1 | | 11/2019 | Bellardi et al. | |
| 2020/0116207 | A1 | | 4/2020 | Siegel et al. | |

FOREIGN PATENT DOCUMENTS

| | | |
|---|---|---|
| DE | 29823591 U1 | 9/1999 |
| JP | 2013221621 | 10/2013 |
| KR | 10-2019-0001633 A | 1/2019 |

OTHER PUBLICATIONS

Korean Intellectual Property Office Application No. 10-2022-0174037, Office Action dated Oct. 13, 2025, 5 pages.

* cited by examiner

BRAKE DISK WITH PROTRUSIONS

CROSS-REFERENCE TO RELATED APPLICATION

This application claims the benefit of priority to German Patent Application No. 102021214337.7, filed on Dec. 14, 2021, the entire content of which is incorporated herein by reference.

TECHNICAL FIELD

The present invention is in the field of mechanical engineering. It relates to a brake disk for a disk brake system. The invention is aimed at solving issues of pad suction and drag torque, which occur during driving in disk brake systems.

BACKGROUND

In disk brake systems, enabling efficient braking while avoiding undesired drag when the brakes are not applied is known to be a highly non-trivial task that is subject to trade-offs. Small gap sizes between the brake disk and the brake pads are typically desired for improved braking performance and pedal feel. Not least because of these small gap-sizes, various undesired effects sometimes occur in disk brake systems. For instance, undesired drag torque may occur after braking, if the brake pads are not retracted quickly enough or evenly enough. A gyroscopic effect sometimes occurs, wherein the brake disk moves towards the brake pads. Furthermore, suction may occur during driving, even independently from a brake application, wherein, the brake pads are suddenly pulled to the brake disk. The latter effect occurs for instance due to a change in the pressure conditions in the area of the inlet and outlet side of the air gap between the brake pad and the disc. The inventor has realized that certain operating conditions (temperature, speed, pressure) and geometry parameters (including e.g. a possible chamfer or slot) lead to a negative pressure within the gap, which in turn leads to a sudden adhesion or attraction of the lining to the disc.

SUMMARY

It is an object of the present invention to address at least some of the problems listed above.

This is achieved by a brake disk according to claim 1. Advantageous embodiments can be found in the dependent claims and in the following description and the figures.

Accordingly, a brake disk for a disk brake system is presented, having at least one friction surface, which is at least sectionally delimited by at least one protrusion, protruding from the at least one friction surface, at an outer circumferential side and/or at an inner circumferential side of the at least one friction surface.

The at least one protrusion produces an additional curvature feature at the outer side and/or inner side of the friction surface, which influences the aerodynamics and the air flow generated by disc rotation. At the inner side and/or the outer side of the friction surface, the airflow is deflected by the respective protrusion delimiting the friction surface, and brought back towards the gap between pads and disk. This helps to avoid appearance of negative pressure, which sometimes occurs due to changing of the gap width. These new geometrical features support an airflow that pushes the pads away so that they keep enough distance to disk surface.

The at least one protrusion is thus configured to create an airflow which helps to prevent in particular pad suction.

The protrusions typically protrude from an otherwise flat friction ring of the brake disk, extending in an axial direction. They may in particular be provided in the vicinity of the inner and/or outer edge of the friction ring as will be described in more detail below. There, they may extend along at least a section of a circumference of the friction ring. If protrusions are envisioned at both the inner and the outer circumferential side of the friction surface, which may optionally be the case, it is understood that a brake pad contacts the friction surface between these protrusions.

For instance, according to an embodiment, a pressure may be created by having at least one protrusion at the outer circumferential side of the friction surface, in particular near the outer circumferential edge, deflecting an outward airflow circulated along with the disc, the airflow then pushing away the pad.

Additionally or alternatively, at least one protrusion may be envisioned at the inner circumferential side of the friction surface(s) of the disc.

In an embodiment of the brake disk, a first protrusion may be provided at the outer circumferential side of the at least one friction surface, and a further protrusion (which may be called a second protrusion) may be provided at the inner circumferential side of the at least one friction surface, wherein the at least one friction surface is in particular a first friction surface that is configured to face outward when mounted within a vehicle.

For example, the at least one friction surface may comprise a first friction surface and a second friction surface. Then, for example, a first protrusion may be provided at the outer circumferential side of the first friction surface. A further protrusion (which may be called a third protrusion— without making any assumption on the total number of protrusions present) may be provided at the outer circumferential side of the second friction surface.

In an example, at least one of the at least one protrusion may extend along an entirety of a circumference of the respective friction surface. I.e., it may be provided continuously and uninterruptedly along the inner circumferential side and/or the outer circumferential side of the friction surface at which it is arranged.

Additionally or alternatively, the at least one protrusion may include a plurality of protrusions that are intermittently arranged, such that the at least one friction surface, at its inner circumferential side and/or at its outer circumferential side, is sectionally delimited by the plurality of protrusions.

In an example, at least one of the at least one protrusion may include a rising section adjoining the respective friction surface at which the at least one protrusion is arranged. Optionally, the protrusion having the rising section includes a flat section adjoining the rising section, the flat section being parallel to the friction surface. For example, the flat section may extend over at least 0.5 mm or at least 1 mm or at least 1.5 mm and/or at most 3 mm or at most 2 mm in a radial direction.

If the rising section is envisioned for at least one of the protrusions, the rising section may for instance be curved, in particular having a radius of curvature of at least 2 mm and/or at most 5 mm.

If the rising section is envisioned for one of the protrusions, the rising section may for instance be flat, the rising section in particular being at an angle of at least 5 degrees and/or at most 30 degrees with respect to the respective friction surface.

If the rising section is envisioned for one of the protrusions, the rising section may for instance extend over at least 1 mm or at least 1.5 mm and/or at most 5 mm or at most 4 mm or at most 3 mm in a radial direction.

For example, at least one of the at least one protrusion, in particular each of the protrusions, may protrude by at least 1 mm or at least 1.5 mm and/or at most 5 mm or at most 4 mm or at most 3 mm from the respective friction surface.

For example, at least one of the at least one protrusion, in particular each of the protrusions, may be confined to a region extending radially at most 8 mm or at most 7 mm or at most 6 mm and/or at least 1 mm or at least 1.5 mm or at least 2 mm or at least 3 mm from an inner circumferential edge and/or an outer circumferential edge of a friction ring of the brake disk.

The brake disk may be designed as a ventilated disk, in particular having holes in the at least one friction surface. Alternatively, the brake disk may be designed as a non-ventilated disk, in particular a solid disk.

The brake disk may be made from grey-cast material or ceramics. Additionally or alternatively, the brake disk may comprise a coating.

The invention also relates to a brake system having a brake disk of the above-mentioned type. The brake system may be a brake system for a vehicle, in particular a car or a truck. The brake system comprises the aforementioned brake disk, according to any of the embodiments explained above. Furthermore, the brake system comprises at least one brake pad configured for engaging with the at least one friction surface.

In the brake system, a distance between an edge of the at least one brake pad and the at least one protrusion may for instance be at least 0.3 mm or at least 0.5 mm and/or at most 2 mm or at most 1.5 mm.

The brake system may further comprise a caliper, wherein at least one of the at least one protrusion may be provided at a first friction surface facing outward, a first brake pad that is configured to engage with said first friction surface being held by a caliper finger of the caliper.

BRIEF DESCRIPTION OF THE DRAWINGS

Exemplary embodiments of the brake disk and brake system are shown in the Figures.

Therein.

DETAILED DESCRIPTION

Figure 1:
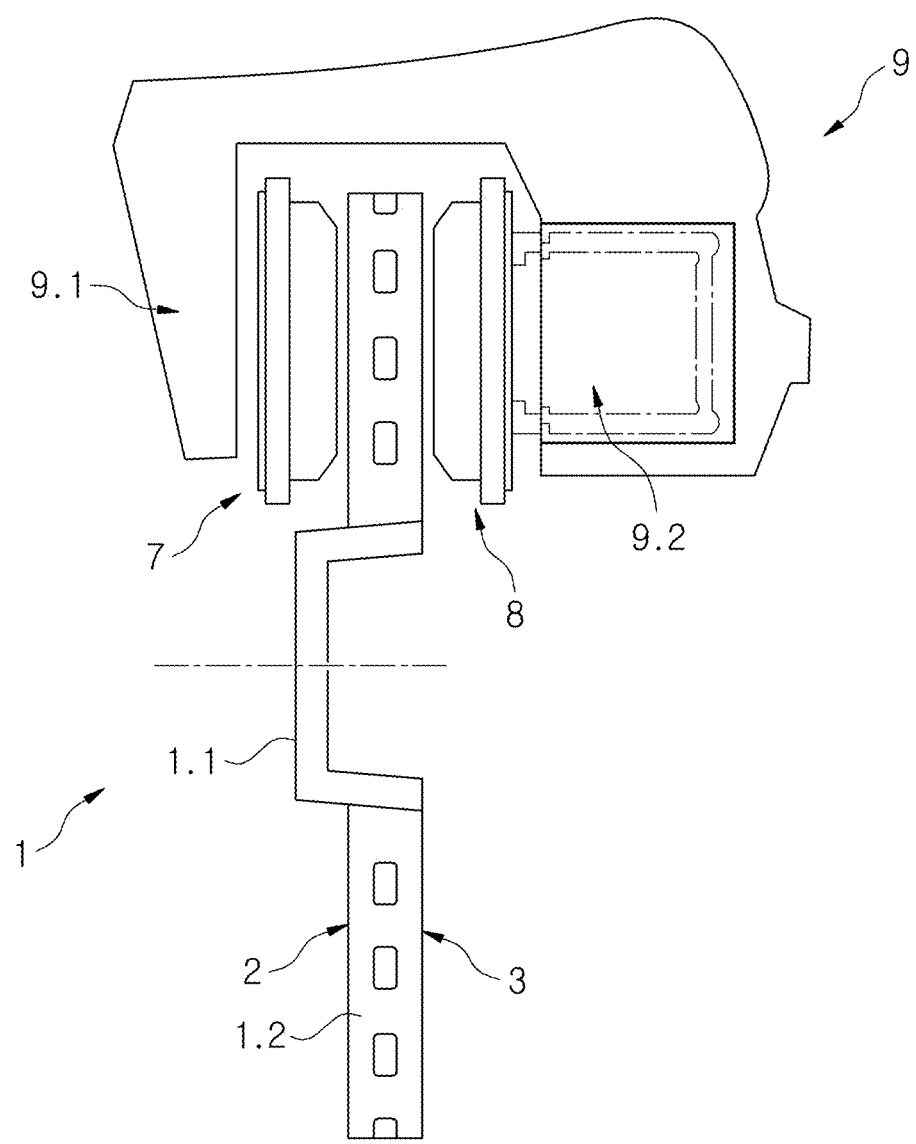
FIG. 1 shows parts a brake system.

FIG. 1 shows a brake system comprising a brake disk 1 and a caliper 9 holding two brake pads 7, 8. The brake disk comprises a hub 1.1 and a friction ring 1.2. The caliper 9 has a caliper finger 9.1 holding a first brake pad 7 (the outer brake pad), which is configured to be pushed against a first friction surface 2 (the outer friction surface) of the brake disk. The caliper 9 furthermore comprises a piston 9.2 on the side of a second brake pad 8 (the inner brake pad), the second brake pad 8 being configured to be pushed against a second friction surface 3 (the inner friction surface) of the brake disk.

Figure 2:
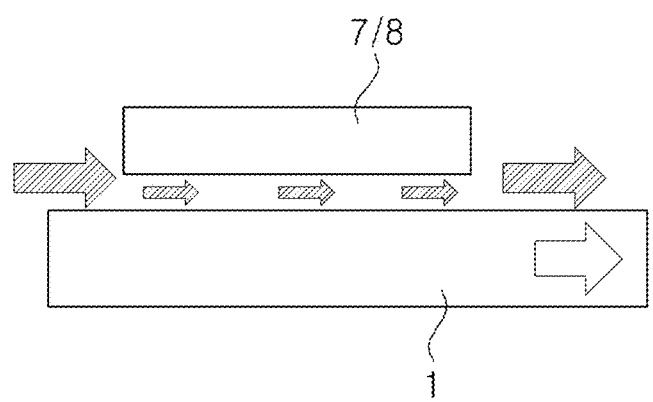
FIGS. 2-3 illustrate pad suction.
Figure 3:
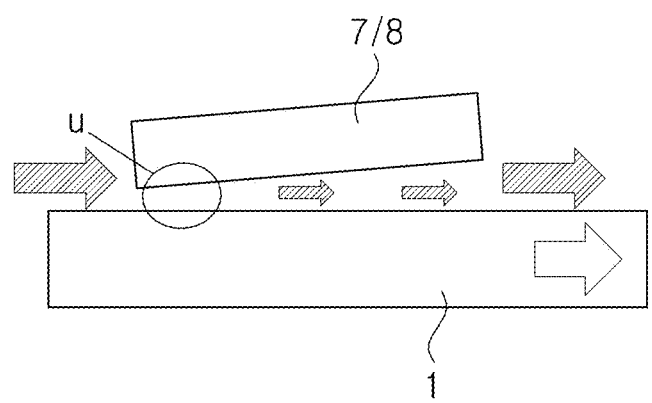

FIGS. 2 and 3 illustrate suction that occurs between the brake disk 1 and the brake pads 7/8. Under optimal conditions, a constant gap is kept between disc and pad while the brakes are not applied (cf. FIGS. 2 and 3). However, as the brake disk 1 rotates, as illustrated by the arrow drawn onto the brake pad, an air flow is generated that passes through the gap between brake disk 1 and brake pad 7/8, as illustrated by the solid arrows. This results in complicated pressure conditions. The inventor has realized that underpressure occurs which leads to pad suction. In particular, the circled area in FIG. 3 where the airflow enters the gap is prone to undesired underpressure. This may even result in the brake pad 7/8 being drawn towards the disk 1 even when the brakes are not applied. The following figures illustrate protrusions which are aimed at overcoming this problem. The protrusions may also aid pad retraction after braking.

Figure 4:
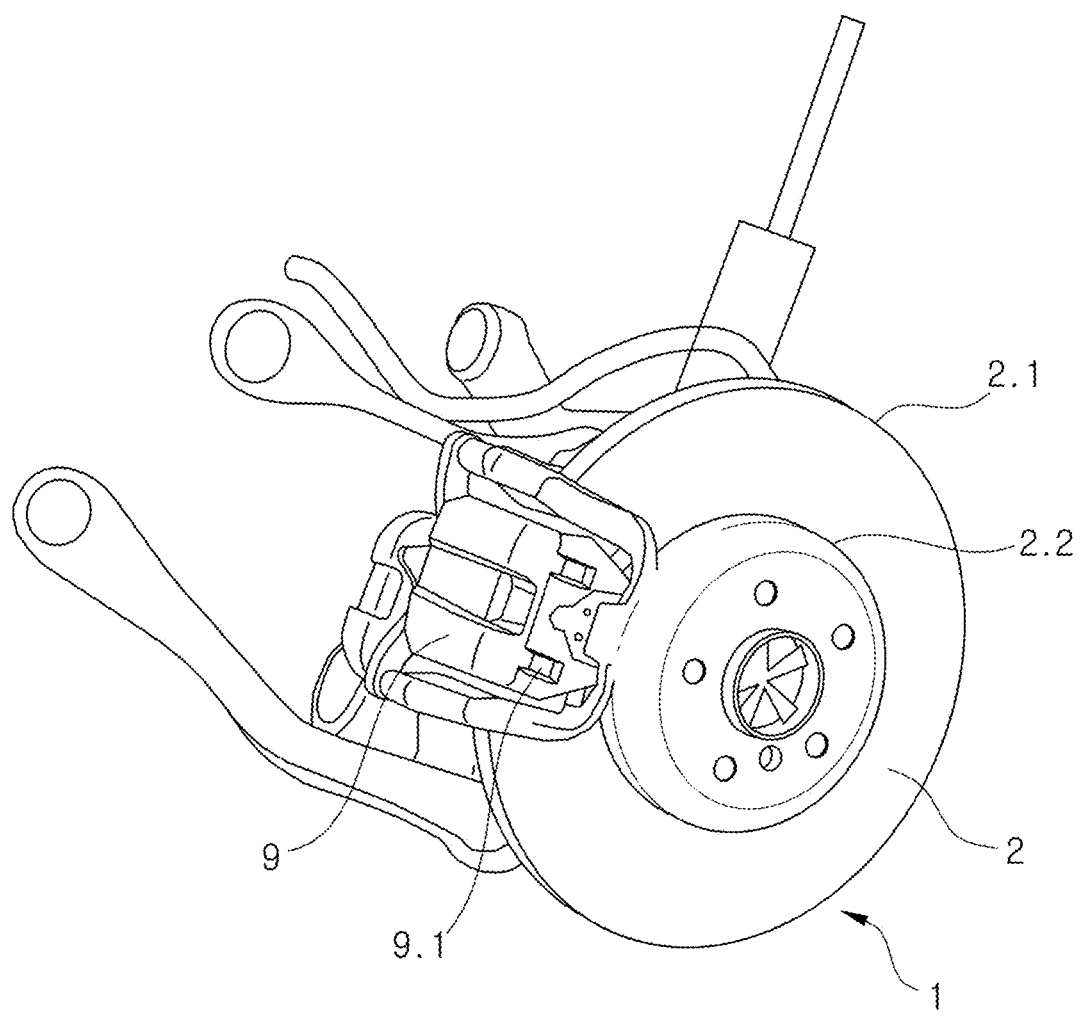
FIG. 4 shows a brake system, wherein an area of modification is indicated.

FIG. 4 shows a brake system for a vehicle, namely for a car or a truck. It comprises a brake disk 1 and a caliper 9 holding two brake pads configured for engaging with the friction surfaces of the brake disk. A first friction surface 2 is visible in FIG. 4. This is the outer friction surface, and a caliper finger 9.1 is provided on the side of this outer friction surface. The friction surface 2 is at least sectionally delimited by protrusions, protruding from the friction surface 2, at an outer circumferential side 2.1 and an inner circumferential side 2.2 of the friction surface 2. The protrusions extend at least along a part of a circumference. Additionally, protrusions of the same type may be provided on the opposing inner side of the brake disk. Different configurations for the protrusions will exemplarily be explained for instance in FIG. 5 and FIGS. 7-13.

Figure 5:
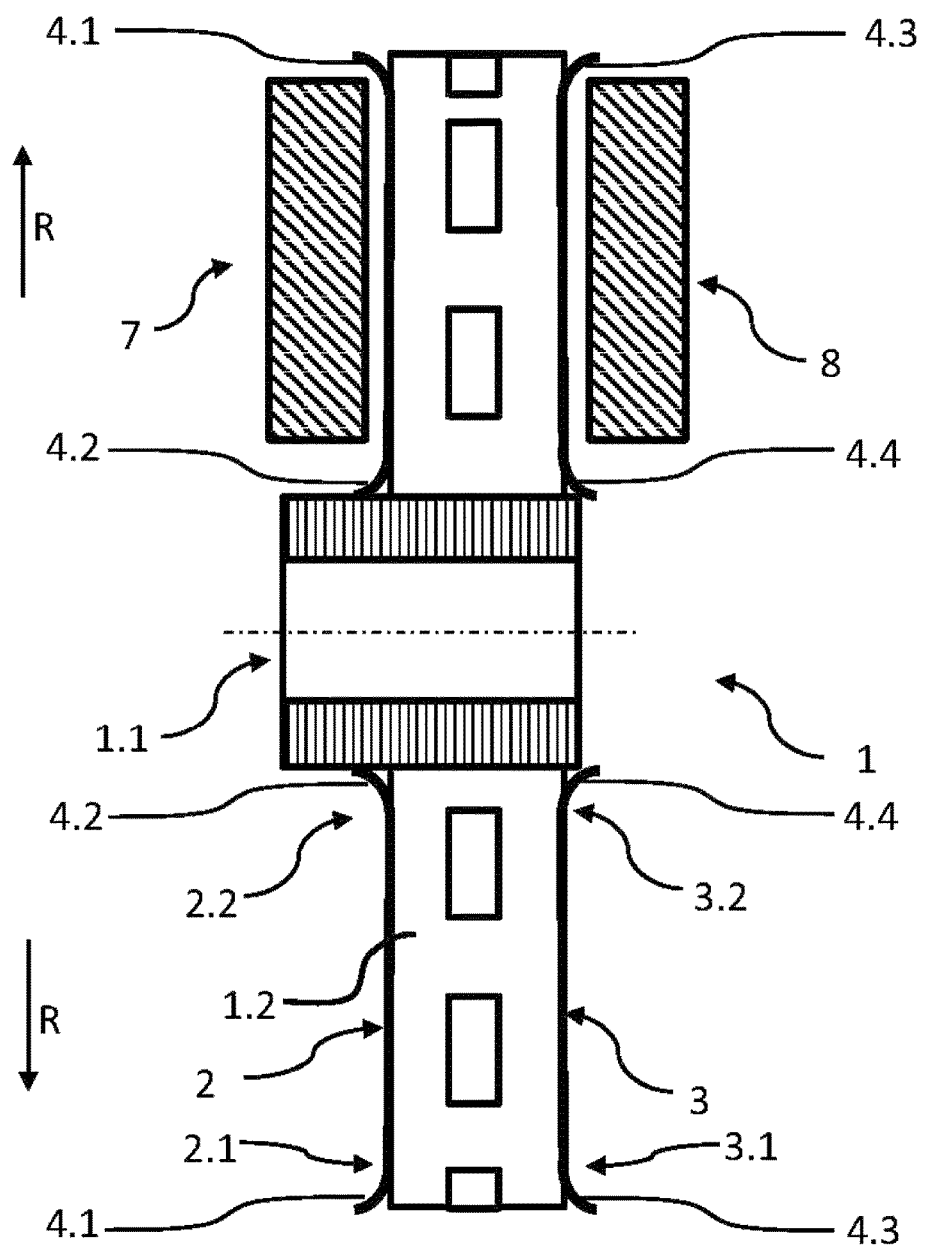
FIG. 5 shows a cut view of a brake system, including a brake disk with protrusions.

FIG. 5 shows a cut through a brake system, exposing a structure of the brake disk 1. The brake disk 1 has a hub 1.1 and a friction ring 1.2. The brake disk 1 according to the embodiment shown in FIG. 5 is optionally designed as a ventilated disk with holes in the friction ring 1.2 which may extend through the friction surfaces. The brake disk 1 is made from grey-cast material or ceramics and/or comprises a coating.

The friction ring 1.2 has a first friction surface 2 facing outward and a second friction surface 3 facing inward when the brake disk is arranged in the vehicle. The first brake 7 is configured to be pressed against the first friction surface 2 and the second brake pad 8 is configured to be pressed against the second friction surface 3.

The friction surfaces are each at least sectionally delimited by protrusions 4.1, 4.2, 4.3, 4.4 therefrom, at the outer circumferential sides 2.1, 3.1 and the inner circumferential sides 2.2, 3.2.

A radial outward direction is indicated by arrows R.

A first protrusion 4.1 is provided at the outer circumferential side 2.1 of the first friction surface 2.

A second protrusion 4.2 is provided at the inner circumferential side 2.2 of the first friction surface 2.

A third protrusion 4.3 is provided at the outer circumferential side 3.1 of the second friction surface 3.

A fourth protrusion 4.4 is provided at the inner circumferential side 3.2 of the second friction surface 3.

Protrusions may be provided on only some of the positions indicated above. This will be explained further in conjunction with FIGS. 7-13

Figure 6:
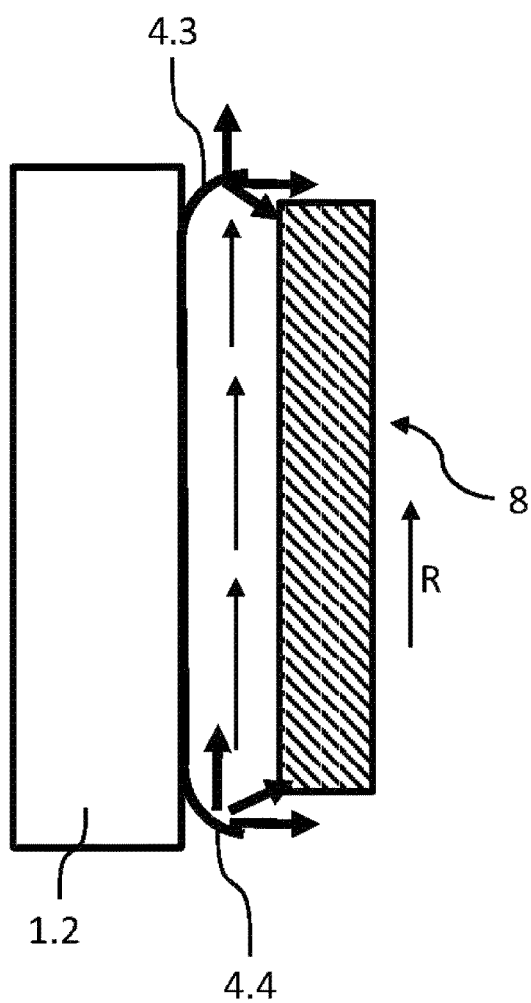
FIG. 6 illustrates an airflow along a brake disk with protrusions.

FIG. 6 exemplarily shows an airflow occurring between the brake pad 8 and the brake disk 1 as the brake disk rotates (into or out of the plane of paper). An airflow having a component in a radially outward direction R is effected. The airflow also has a component in a rotating direction of the brake disk. A resulting airflow is indicated by arrows. The airflow exits from under the brake pad on both the outer circumferential side (dominant) and the inner circumferential side (suppressed due to centrifugal forces). The airflow is deflected by the protrusions 4.3 and 4.4 at the inner and outer circumferential sides of the friction surface and gains a component away from the friction surface, which pushes the brake pad away from the friction surface and stabilizes the brake pad 8 in its non-braking condition.

FIGS. 7-13 show, in cut views, different configurations for the previously-discussed protrusions. I.e., in the brake system according to the invention, for instance, a setup according to any of these figures may be chosen. The focus of FIGS. 7-13 is on the positions at which the protrusions are provided. While the protrusions are each shown as rounded portions, this is understood not to be the only option, for they may in each case be carried out for instance in any of the ways explained in conjunction with FIGS. 17-24.

In FIGS. 7-13, an outer friction surface 2 which is configured to face outward when the brake disk 1 is mounted in a vehicle, is in each case displayed on the left.

Figure 7:
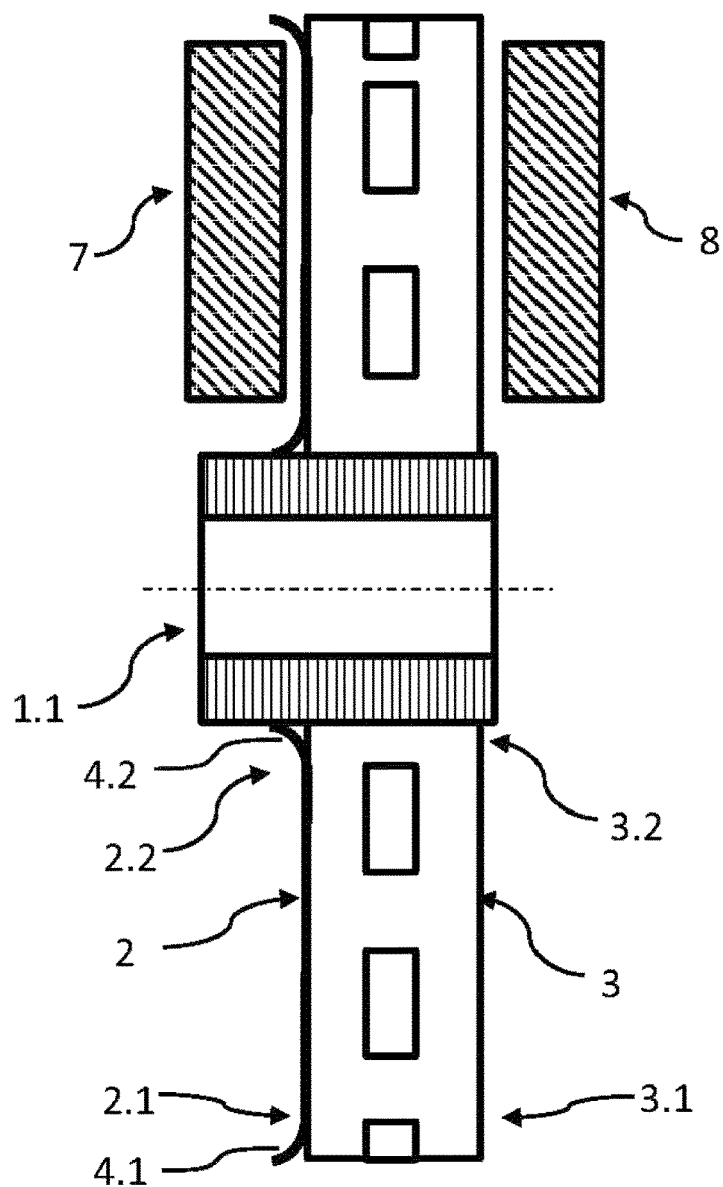
FIGS. 7-13 show different arrangements for the protrusions.

According to FIG. 7 the first friction surface 2 is at least sectionally delimited by at least one protrusion 4.1 (which may be called "first protrusion") protruding from the first friction surface 2 at its outer circumferential side 2.1. The first friction surface 2 furthermore is at least sectionally delimited by at least one protrusion 4.2 (which may be called "second protrusion") at its inner circumferential side 2.2. The second friction surface 3 is devoid of protrusions.

Figure 8:
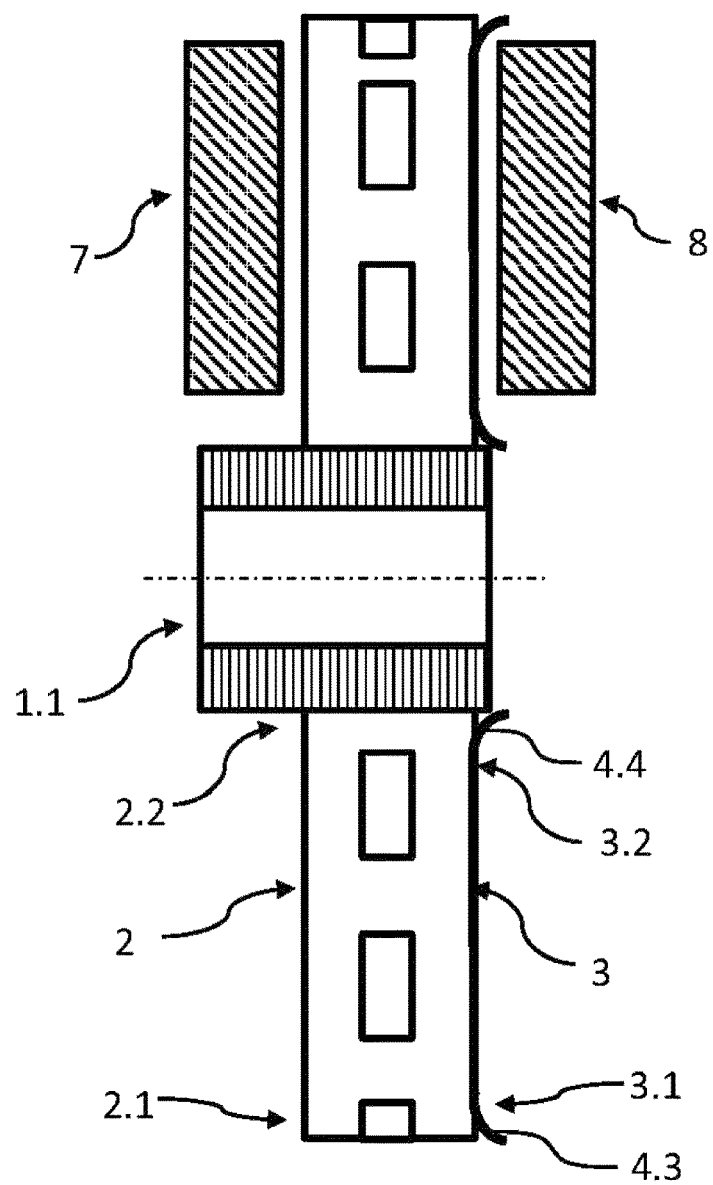

According to FIG. 8, the second friction surface 3 is at least sectionally delimited by at least one protrusion 4.3 (which may be called "third protrusion") protruding from the second friction surface 3 at its outer circumferential side 3.1. The second friction surface 3 furthermore is at least sectionally delimited by at least one protrusion 4.4 (which may be called "fourth protrusion") at its inner circumferential side 3.2. The first friction surface 2 is devoid of protrusions.

Figure 9:
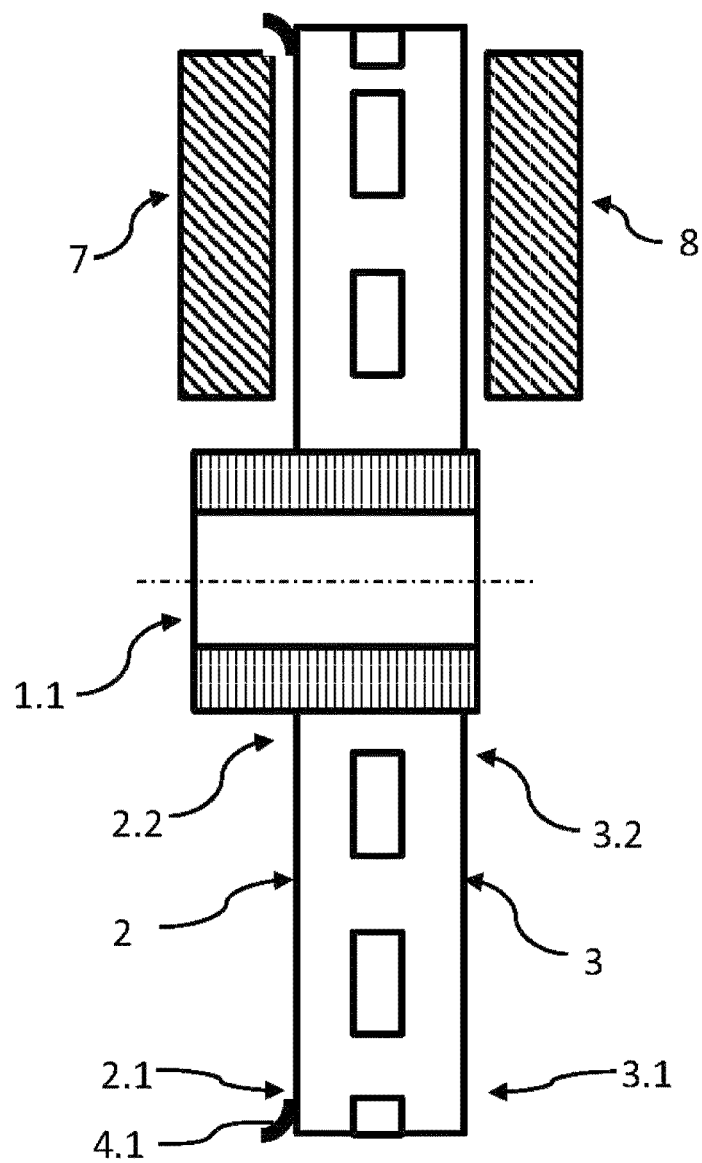

According to FIG. 9, the first friction surface 2 is at least sectionally delimited by at least one protrusion 4.1 (which may be called "first protrusion") protruding from the first friction surface 2 at its outer circumferential side 2.1.

Figure 10:
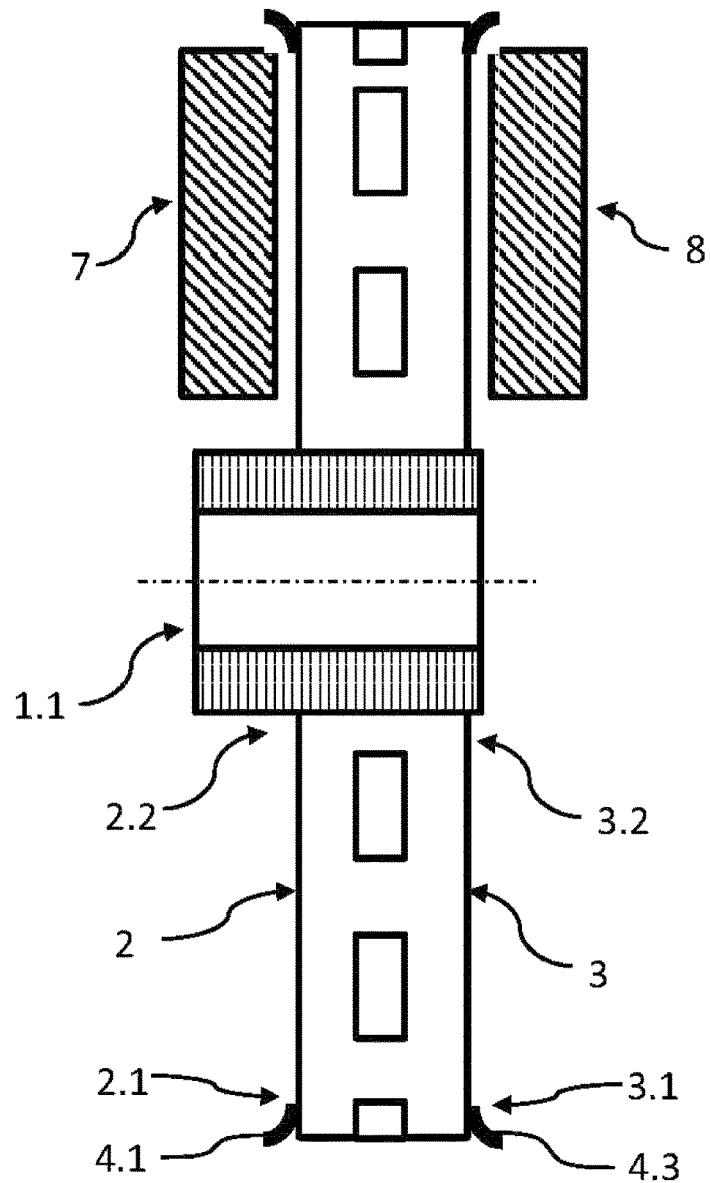

According to FIG. 10 the first friction surface 2 is at least sectionally delimited by at least one protrusion 4.1 (which may be called "first protrusion") protruding from the first friction surface 2 at its outer circumferential side 2.1. Furthermore, the second friction surface 3 is at least sectionally delimited by at least one protrusion 4.3 (which may be called "third protrusion") protruding from the second friction surface 3 at its outer circumferential side 3.1.

Figure 11:
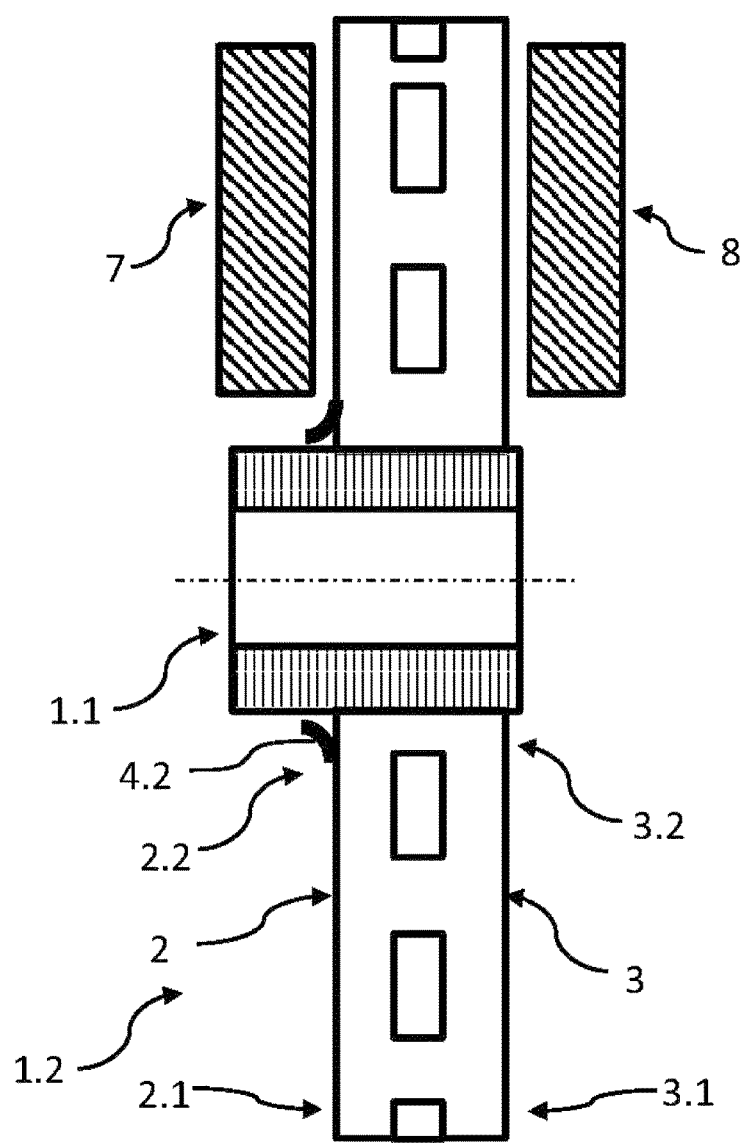

According to FIG. 11, the first friction surface 2 is at least sectionally delimited by at least one protrusion 4.2 (which may be called "second protrusion") at its inner circumferential side 2.2. The second friction surface 3 is devoid of protrusions.

Figure 12:
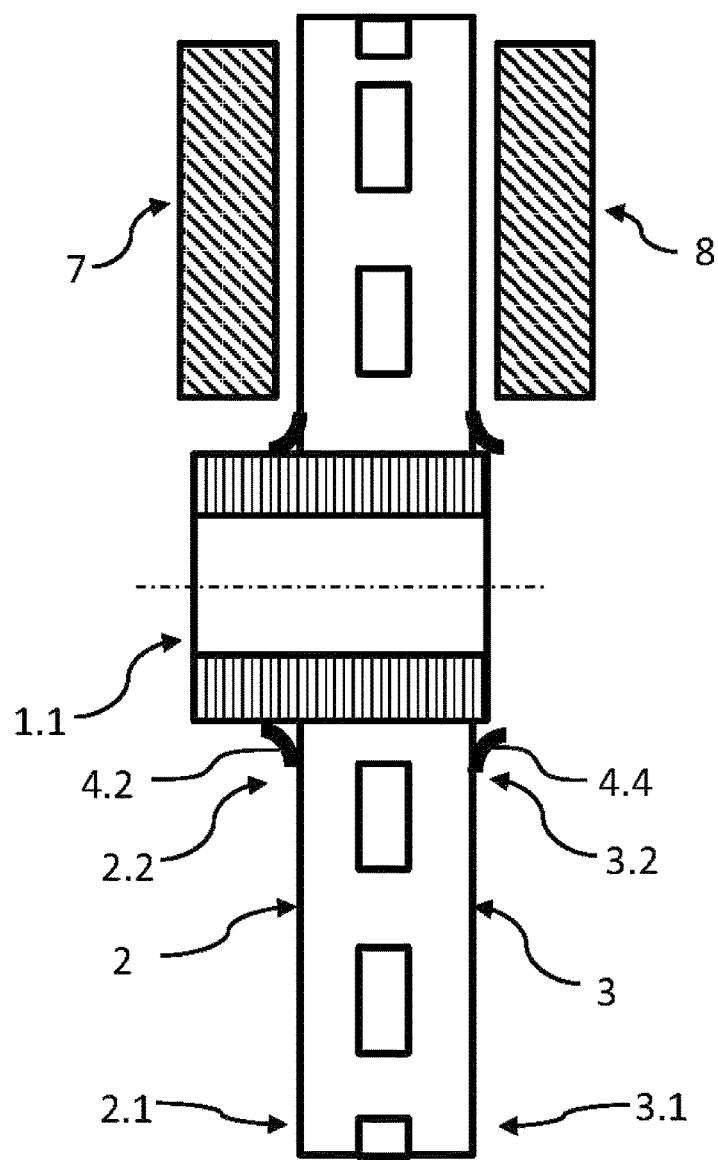

According to FIG. 12, the first friction surface 2 is at least sectionally delimited by at least one protrusion 4.2 (which may be called "second protrusion") at its inner circumferential side 2.2. The second friction surface 3 is at least sectionally delimited by at least one protrusion 4.4 (which may be called "fourth protrusion") at its inner circumferential side 3.2.

Figure 13:
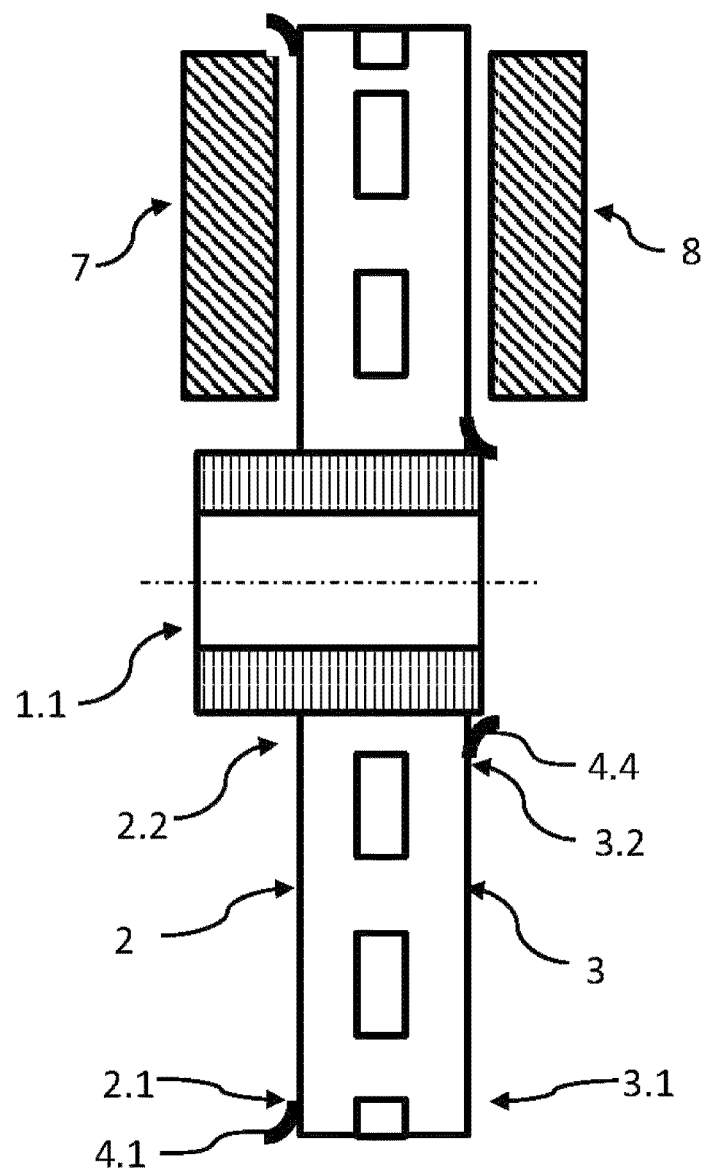

According to FIG. 13, the first friction surface 2 is at least sectionally delimited by at least one protrusion 4.1 (which may be called "first protrusion") protruding from the first friction surface 2 at its outer circumferential side 2.1. The second friction surface 3 is at least sectionally delimited by at least one protrusion 4.4 (which may be called "fourth protrusion") at its inner circumferential side 3.2.

It is understood that the configurations of FIGS. 5 and 7-13 are not exhaustive, and further configurations may be envisioned.

Figure 14:
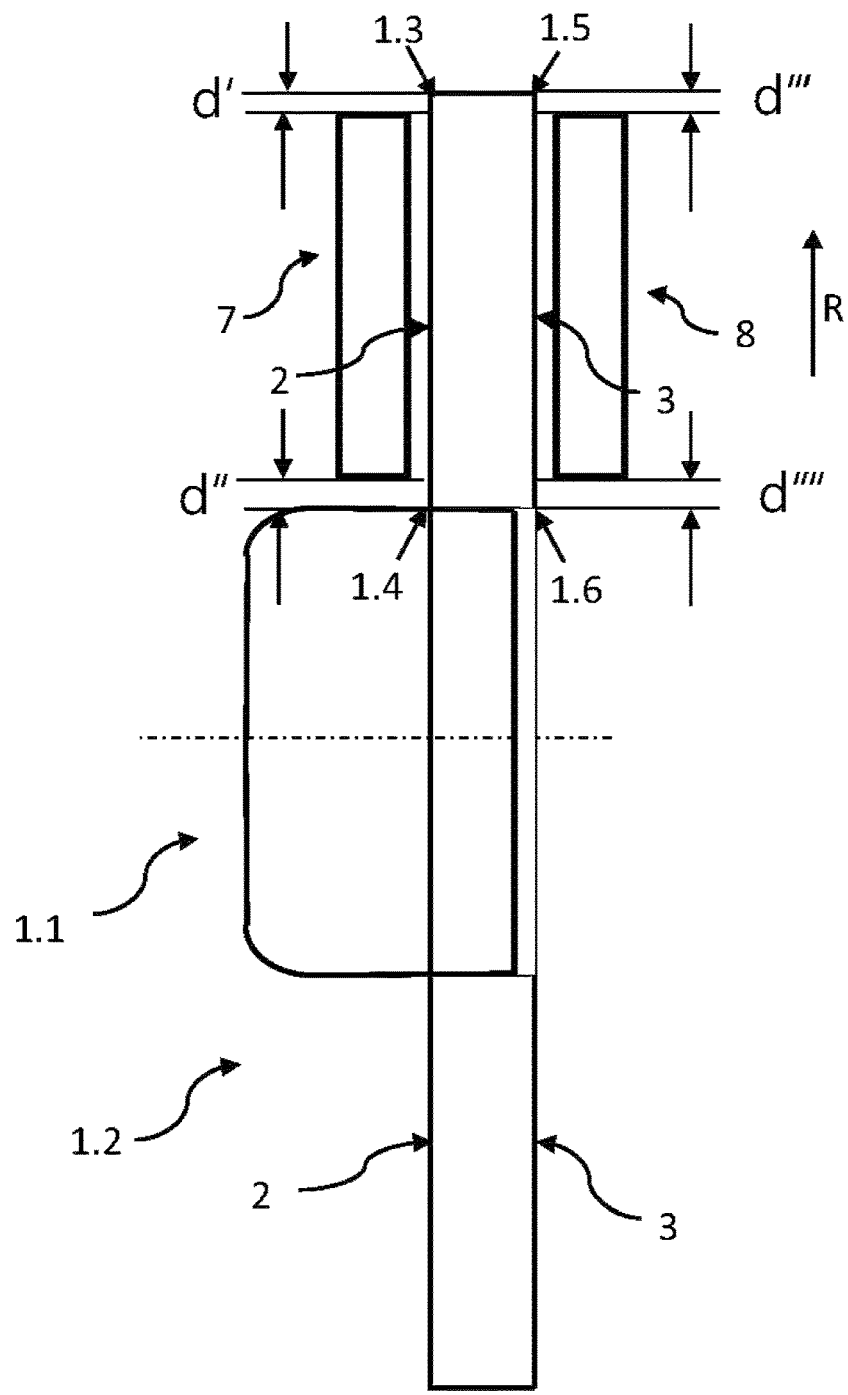
FIGS. 14, 15 illustrate an arrangement of brake pads with respect to the brake disk and the protrusions.
Figure 15:
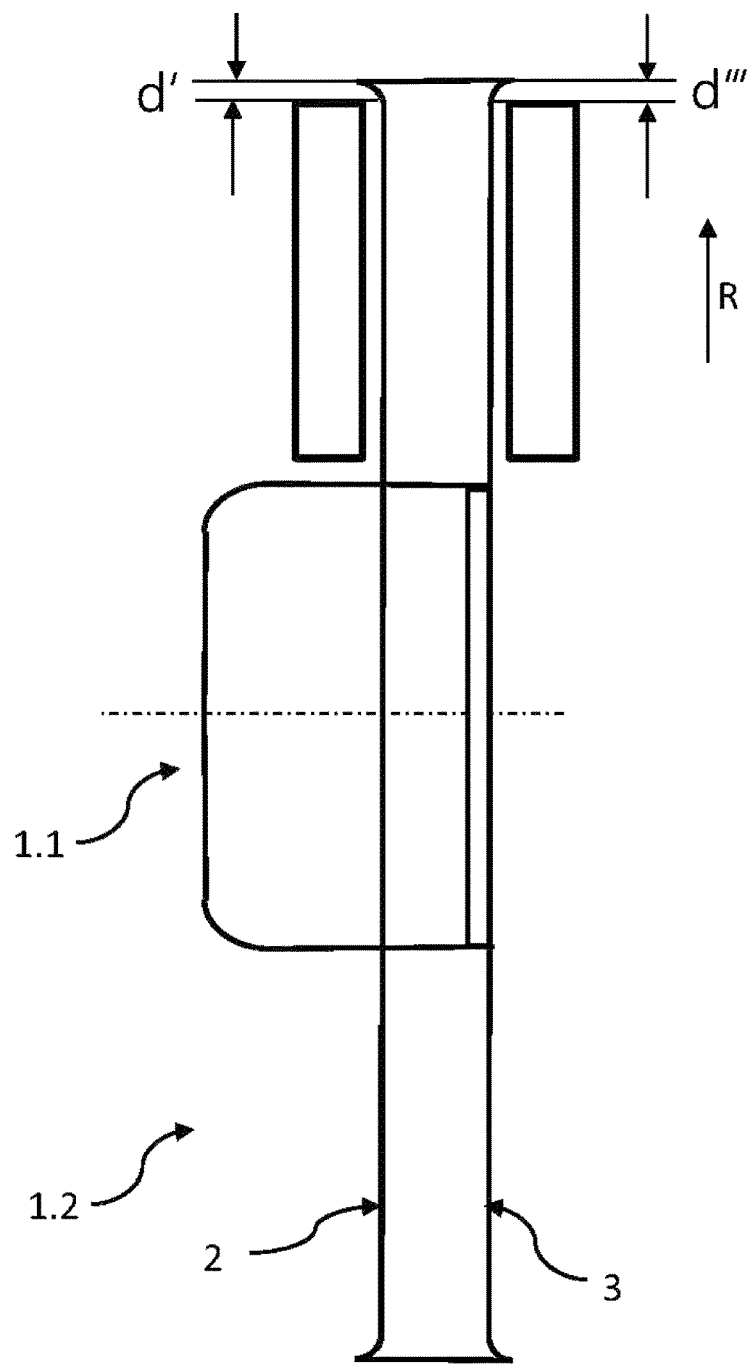

FIG. 14 illustrates, in a cut view, a position of the brake pads 7, 8 with respect to the brake disk 1. The brake pads 7, 8 each extend along the respective friction surface at which they are arranged. The first brake pad extending between a first outer circumferential edge 1.3 of the friction ring 1.2 and a first inner circumferential edge 1.4 of the friction ring 1.2. The second brake pad extending between a second outer circumferential edge 1.5 of the friction ring 1.2 and a second inner circumferential edge 1.6 of the friction ring 1.2.

A distance d' between an edge of the first brake pad 7 and the first outer circumferential edge 1.3 may be at least 3 mm and/or at most 7 mm or at most 6 mm. A distance d" between an edge of the first brake pad 7 and the first inner circumferential edge 1.4 may be at least 3 mm and/or at most 7 mm or at most 6 mm. A distance d''' an edge of the second brake pad 8 and the second outer circumferential edge 1.5 may be at least 3 mm and/or at most 7 mm or at most 6 mm. A distance d'''' an edge of the second brake pad 8 and the second inner circumferential edge 1.6 may be at least 3 mm and/or at most 7 mm or at most 6 mm.

In particular, d', d", d''', d'''' may in each case be between 4 mm and 5 mm

In the brake disk 1, the protrusions 4.1, 4.2, 4.3, 4.4, 4.1', 4.2' discussed herein are confined to the above-indicated regions between the edges of the brake disks 7, 8 and the edges 1.3, 1.4, 1.5, 1.6 of the friction surface 1.2. In particular, the protrusions are typically limited to a region extending radially at most 6 mm or at most 5 mm or at most 4 mm or at most 3 mm and/or at least 1 mm or at least 1.5 mm or at least 2 mm from the inner circumferential edge 1.3, 1.5 and/or the outer circumferential edge 1.4, 1.6 of the friction ring 1.2 of the brake disk 1, as will be explained further here below.

Figure 16:
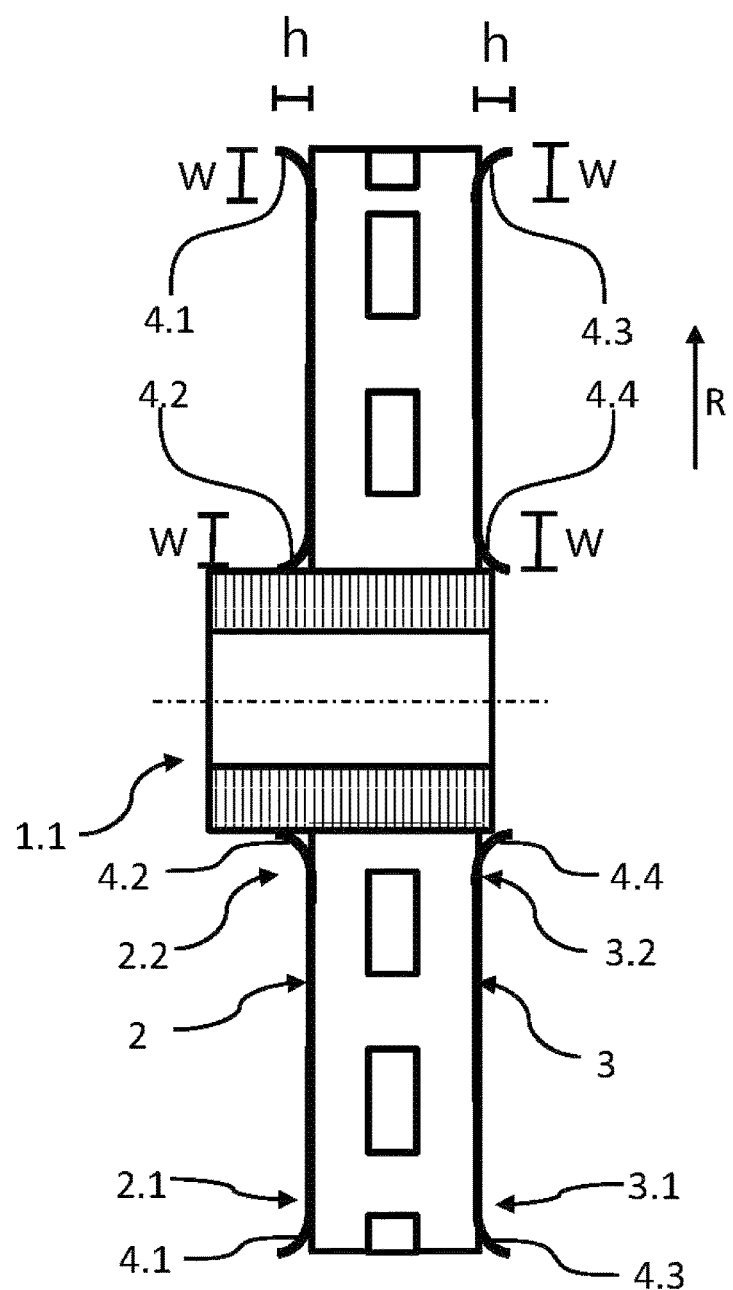
FIG. 16 illustrates dimensions of the protrusions.

Turning to FIG. 16, the dimensions of the protrusions are further discussed. In the case of the brake disk 1 shown in FIG. 16, the protrusions 4.1, 4.2, 4.3, 4.4 is formed by a rising section adjoining the respective friction surface 2, 3 at which they are arranged.

The protrusions 4.1, 4.2, 4.3, 4.4 each extend over a width w of at least 1 mm and/or at most 4 mm in the radial direction R. In particular, they each extend over a width w of 3 mm.

The protrusions 4.1, 4.2, 4.3, 4.4 protrudes by a height h of at least 1.5 mm and/or most 3 mm from the respective friction surface 2, 3. Specifically, they each have a height h of 2 mm.

Figure 17:
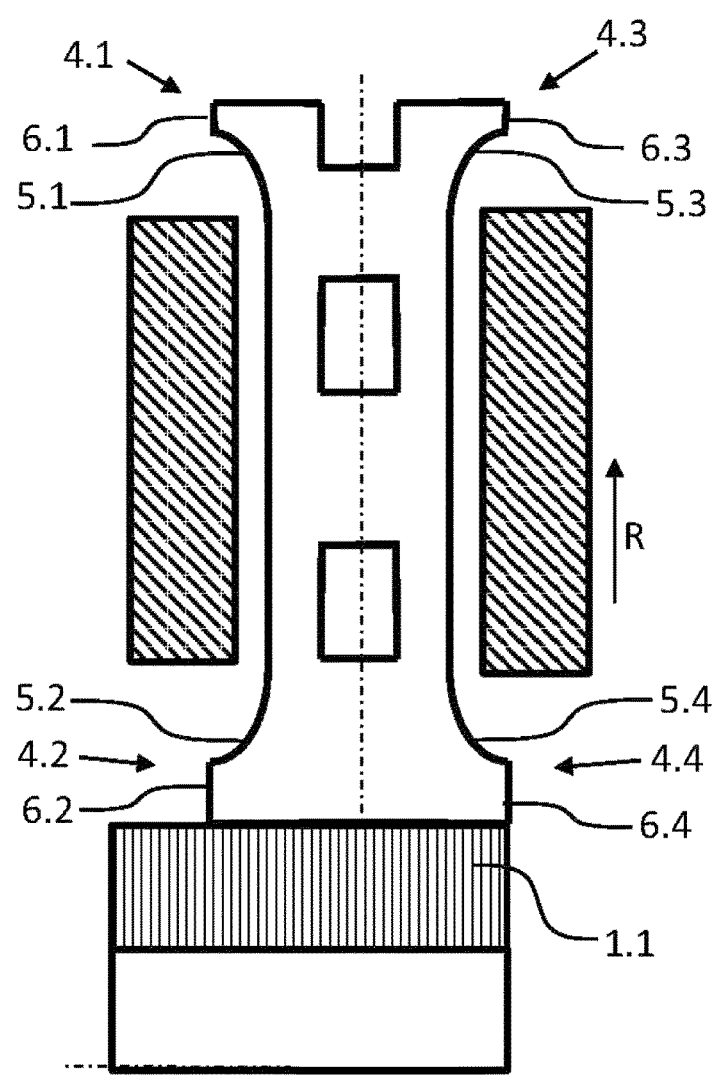
FIGS. 17-24 illustrate different embodiments of the protrusions.

FIG. 17 shows an embodiment of the brake disk, wherein the protrusions 4.1, 4.2, 4.3, 4.4 each include a rising section 5.1, 5.2, 5.3, 5.4 adjoining the respective friction surface 2, 3 at which the at least one protrusion 4.1, 4.2, 4.3, 4.4, 4.1', 4.2' is arranged. Each protrusion 4.1, 4.2, 4.3, 4.4 furthermore includes a flat section 6.1, 6.2, 6.3, 6.4 adjoining the rising section 5.1, 5.2, 5.3, 5.4, the flat section 6.1, 6.2, 6.3, 6.4 being parallel to the friction surface. This is regardless of how the rising portion is carried out, which will be explained in more detail below, with reference to further figures.

Figure 18:
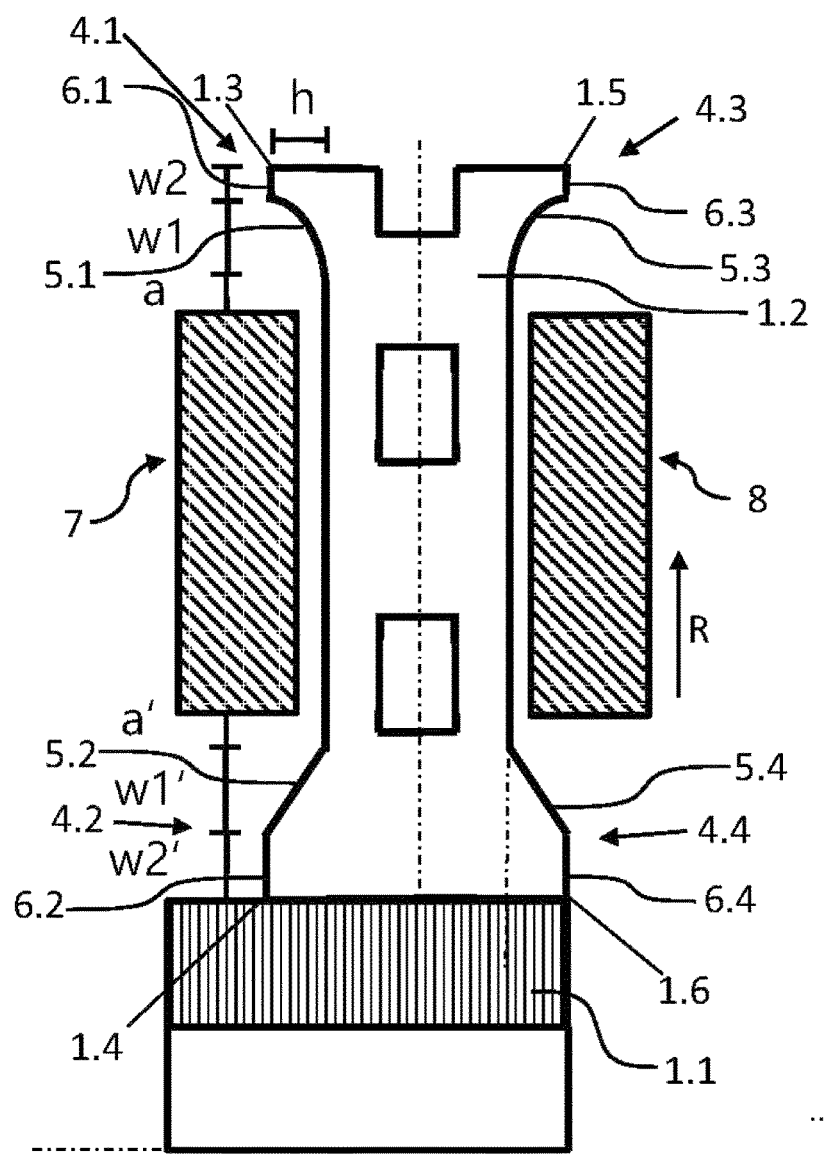

FIG. 18 illustrates some dimensions of the brake system. The two brake pads 7, 8 are arranged to each face one of the first and second friction surface 2, 3. Each of the protrusions 4.1, 4.2, 4.3, 4.4 has a maximum height h of between 1.5 mm and 4 mm, in particular of 3 mm.

The radially outward direction R is once again indicated by an arrow. Turning to the radially outer side of the setup, from a radially outer edge of the brake pads 7, 8, there is a distance a extending in the radial direction along the friction surface 2, 3, which is the distance between the edge of the respective brake pad 7, 8, and the beginning of the respective rising section 5.1, 5.3 of the protrusions. This distance a is chosen to be between 0.5 mm and 1.5 mm, in particular it is chosen to be 1 mm. Moving further in the radially outward direction, there are the rising sections 5.1, 5.3, which extend over a width w1 in the radial direction. The width w1 is chosen to be between 2 and 4 mm, in particular w1 is chosen to be 3 mm. Moving further in the radial outward direction R, there are the flat sections 6.1, 6.3, which extend over a width w2 in the radial direction R. This width w2 is chosen to be between 0.5 mm and 1.5, in particular w2 is chosen to be 1 mm. The flat sections 6.1, 6.3 extend all the way to the outer circumferential edges 1.3, 1.5 of the friction ring 1.2. This way, the protrusions 4.1, 4.3, including their rising sections 5.1, 5.3, and their flat sections 6.1, 6.3 are confined to a region w1+w2 from the outer circumferential edges 1.3, 1.5 of the friction ring 1.2, w1+w2 being between 2.5 mm and 5.5 mm, in particular being 4 mm.

Turning now to the inner circumferential sides of the friction surfaces 2, 3, from the inner circumferential edges of the brake pads 7, 8, there is a distance a' in the negative radial direction (radial inward direction, towards the hub 1.1), to the beginning of the protrusions 4.2, 4.4. This distance a' is chosen to be between 0.5 mm and 1.5, in particular it is chosen to be 1 mm. Moving further in the radial inward direction, there are rising portions 5.2, 5.4, extending in the radial direction over a width w1'. This width w1' is chosen to be between 2 mm and 5 mm, in particular w1' is chosen to be 3.5 mm. Adjoining these rising portions 5.2, 5.4, moving further in the radially inner direction, there are flat portions 6.2, 6.4. They extend over a width w2' in the radial direction, w2' being chosen between 1 mm and 3 mm, in particular being chosen to be 2 mm. The radially inner protrusions 4.2, 4.4, in particular their flat portions 6.2, 6.4 extend all the way to the inner circumferential edges 1.4, 1.6 of the friction ring 1.2. This way, the radially inner protrusions 4.2, 4.4 are confined to a distance w1'+w2' from the inner edges 1.4, 1.6 of the friction ring 1.2, w1'+w2' being between 3 mm and 8 mm, in particular being 5.5 mm.

The statements made with regard to the dimensions of FIG. 18 are once again regardless of the way the rising sections 5.1, 5.2, 5.3, 5.4 are carried out.

Figure 19:
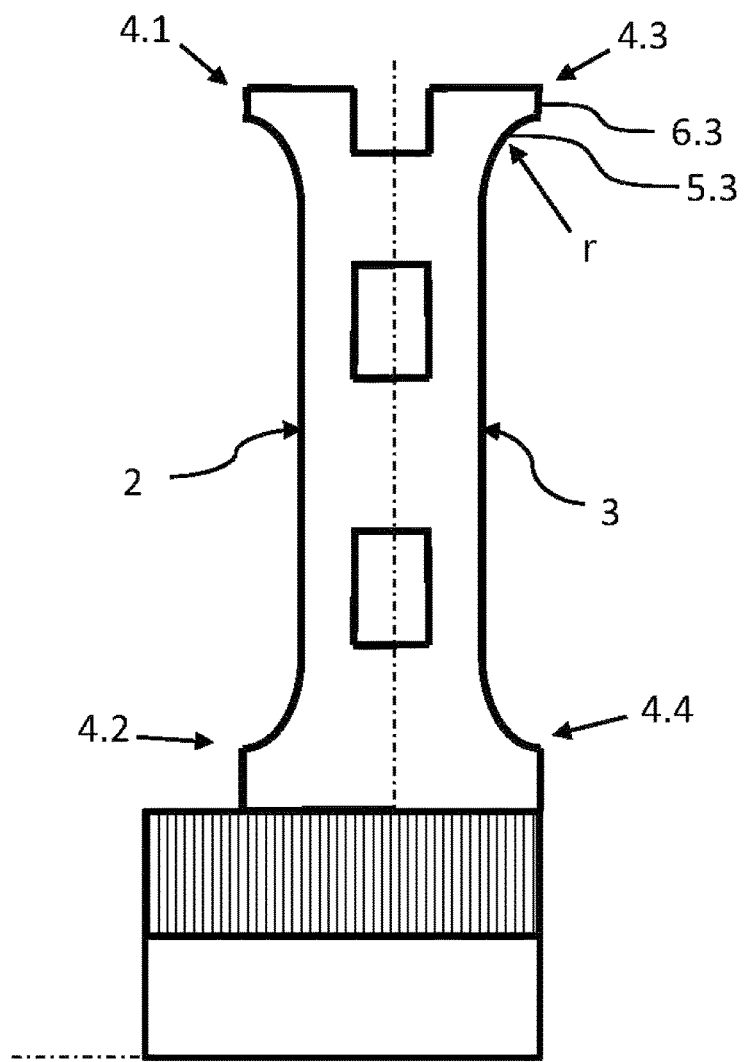

FIG. 19 shows an embodiment where the protrusions 4.1, 4.2, 4.3, 4.4 each are carried out with rising sections that are curved. As illustrated exemplarily on the rising section 5.3 on the outer circumferential side of the second friction surface 3, all of the rising sections have a radius of curvature r that is between 2 mm and 5 mm, in particular it is chosen to be 3 mm.

Figure 20:
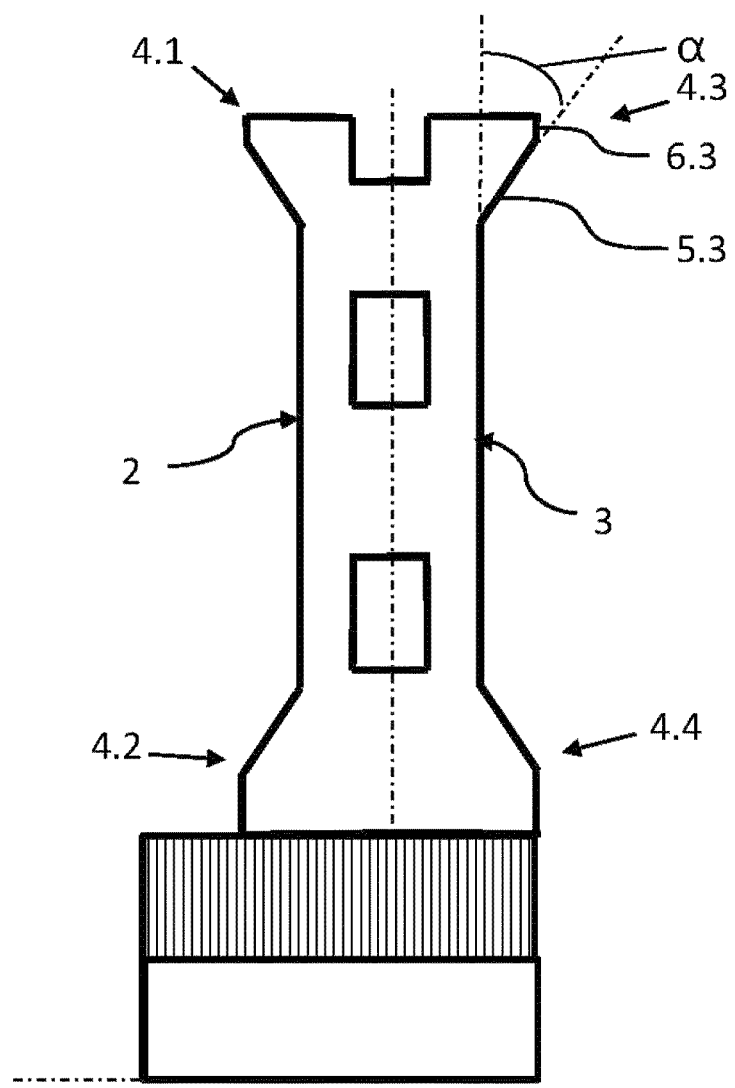

FIG. 20 shows an embodiment where the protrusions 4.1, 4.2, 4.3, 4.4 each have a rising section that is flat. As illustrated by way of example on the rising section 5.3, all of the rising sections have an angle α with respect to the respective friction surface 2, 3 at which they are arranged.

The angle α is chosen to be 5 degrees and 30 degrees, in particular it is chosen to be 15 degrees.

Figure 21:
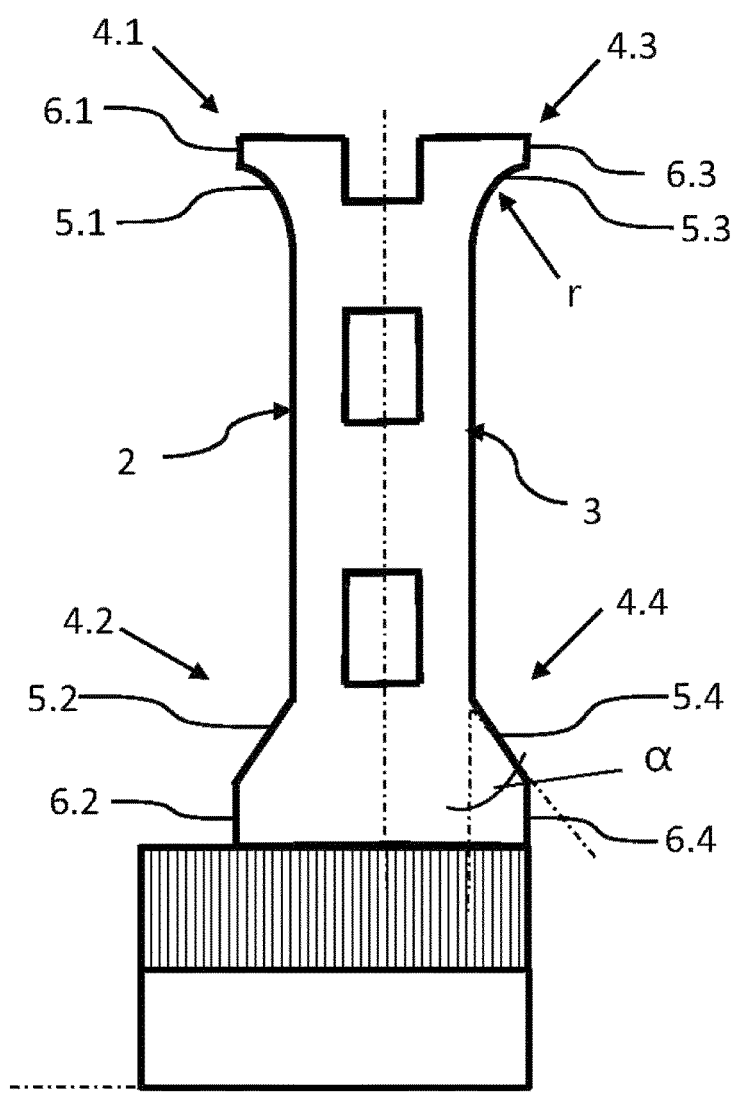

FIG. 21 shows an embodiment where the outer circumferential protrusions 4.1, 4.3 have rising sections 5.1, 5.3 that are curved, with the aforementioned radius of curvature r. The inner circumferential protrusions 4.2, 4.4 have rising sections 5.2, 5.4 that are flat, with the aforementioned angle α with respect to the friction surfaces 2, 3.

Figure 22:
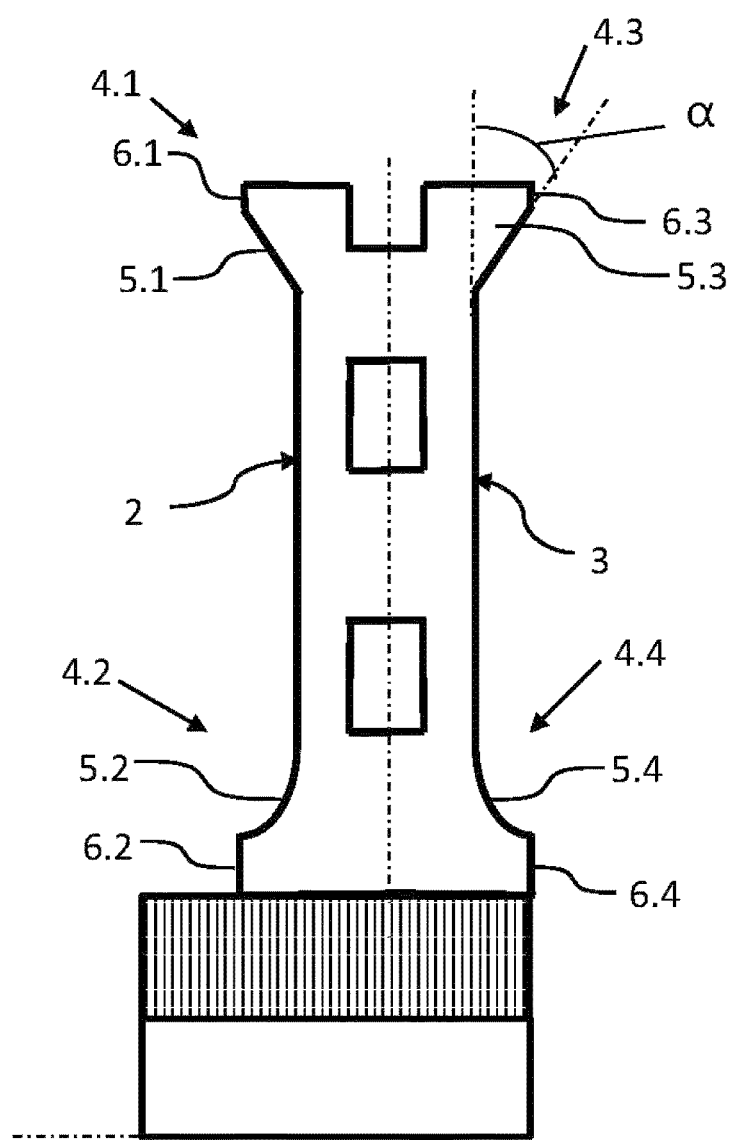

FIG. 22 shows an embodiment where the outer circumferential protrusions 4.1, 4.3 have rising sections 5.1, 5.3 that are flat. The inner circumferential protrusions 4.2, 4.4 have rising sections 5.2, 5.4 that curved, with the aforementioned radius of curvature r.

Figure 23:
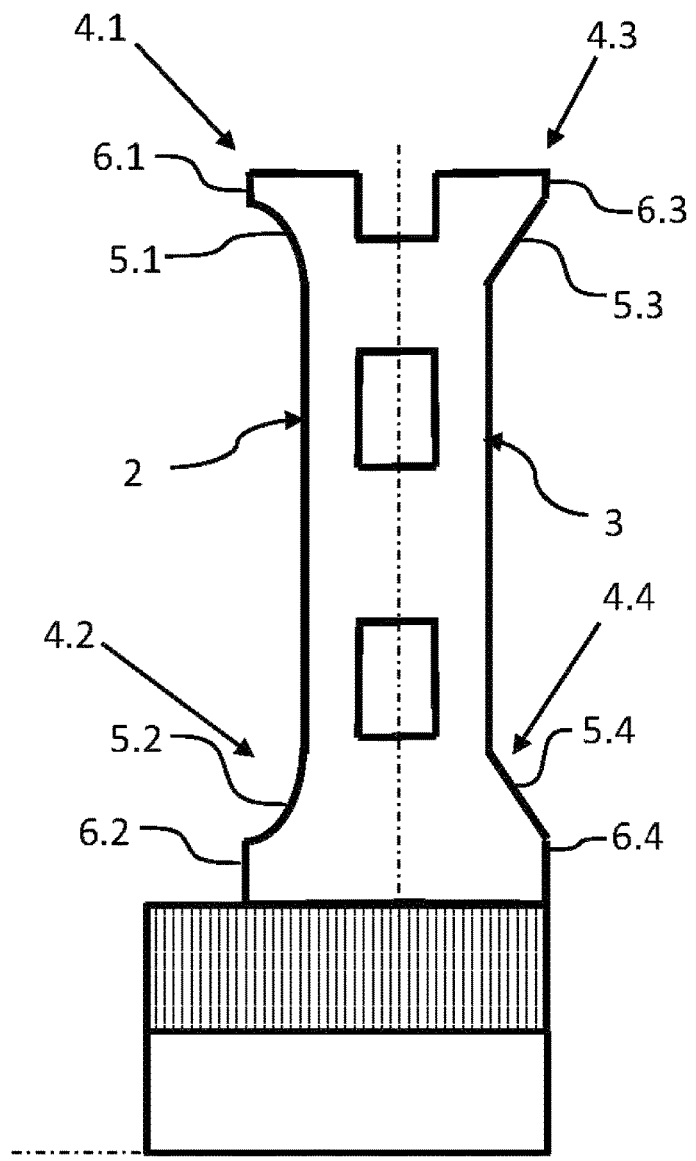

FIG. 23 shows an embodiment where the protrusions 4.1, 4.2 delimiting the first friction surface 2 have rising sections 5.1, 5.2 that are curved, with the above-mentioned radius of curvature r. The protrusions 4.3, 4.4 at the second friction surface 3 have rising sections 5.3, 5.4 that are flat, with the aforementioned angle α with respect to the second friction surface 3.

Figure 24:
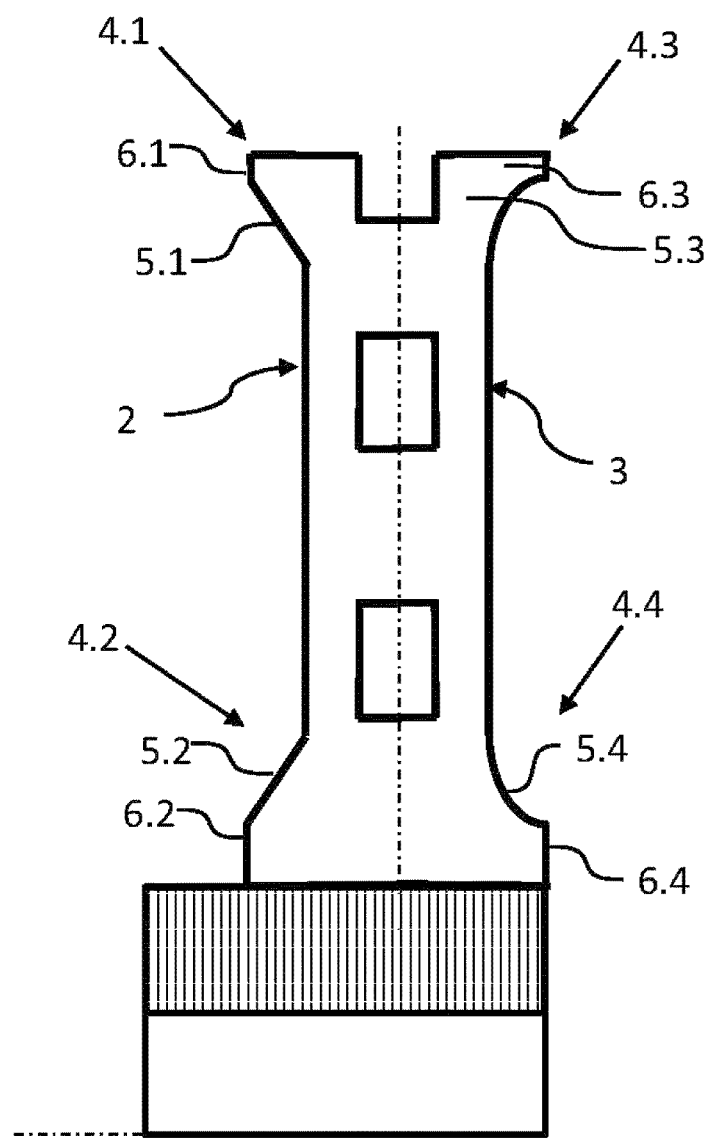

FIG. 24 shows an embodiment where the protrusions 4.1, 4.2 delimiting the first friction surface 2 have rising sections 5.1, 5.2 that are flat, with the aforementioned angle α with respect to the first friction surface 2. The protrusions 4.3, 4.4 at the second friction surface 3 have rising sections 5.3, 5.4 that are curved, with the above-mentioned radius of curvature r.

FIGS. 25-28 demonstrate how the protrusions 4.1, 4.2, 4.3, 4.4, 4.1', 4.2', 4.3', 4.4' may extend along a circumference of the friction ring, i.e. in the tangential direction. In each case, reference is made to both the first friction surface 2 and the second friction surface 3, since these setups may be applied to either one or to both of the friction surfaces 2, 3. It is understood that the setups shown in FIGS. 25-28 are compatible with each of the embodiments shown in any of the previous figures, and it is understood that according to embodiments, the inner circumferential protrusions 4.2, 4.4, 4.2', 4.4' or the outer circumferential protrusions 4.1, 4.3, 4.1', 4.3' may be omitted.

Figure 25:
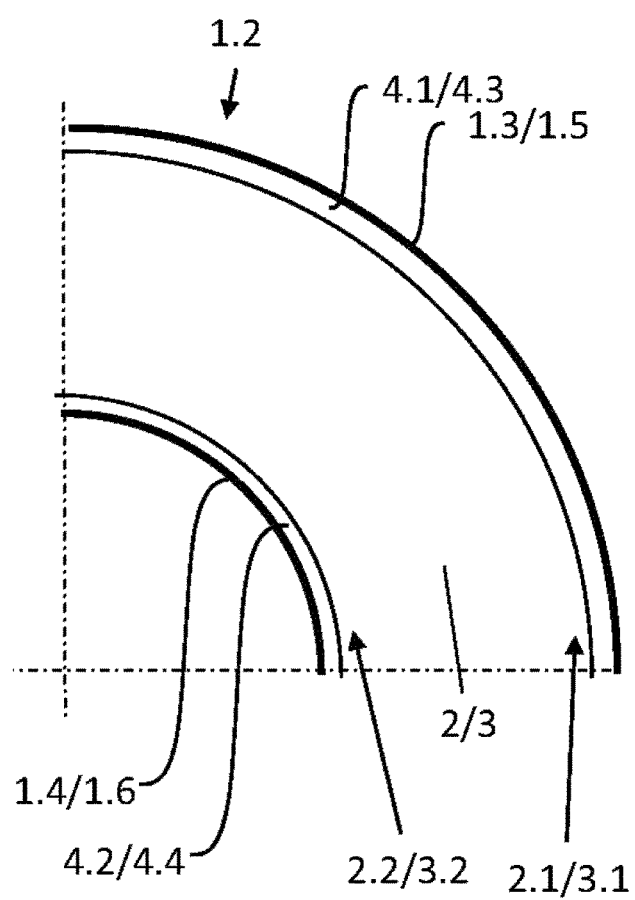
FIGS. 25-28 show continuous and interrupted protrusions.

FIG. 25 shows a setup, wherein, at the inner circumferential edge 1.4/1.6 of the friction ring 1.2, a protrusion 4.2/4.4 is provided, which extends along an entirety of a circumference of the respective friction surface 2/3, delimiting the friction surface 2/3 on its inner circumferential side 2.2/3.2. Furthermore, at the outer circumferential edge 1.3/1.5 of the friction ring 1.2, a protrusion 4.1/4.3 is provided, which extends along an entirety of a circumference of the respective friction surface 2/3, delimiting the friction surface 2/3 on its outer circumferential side 2.1/3.1.

Figure 26:
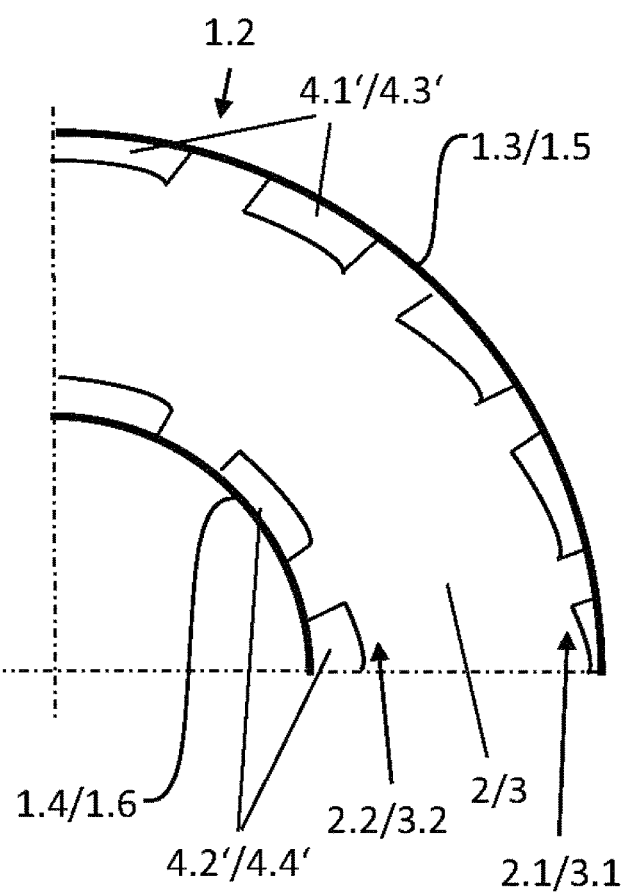

FIG. 26 shows a setup, wherein at the inner circumferential edge 1.4/1.6 of the friction ring 1.2, a plurality of protrusions 4.2'/4.4' is provided, which are intermittently arranged, such that the respective friction surface 2/3 is sectionally delimited by the plurality of protrusions 4.2'/4.4' at its inner circumferential side 2.2/3.2. Furthermore, at the outer circumferential edge 1.3/1.5 of the friction ring 1.2, a plurality of protrusions 4.1'/4.3' is provided, which are intermittently arranged, such that the respective friction surface 2/3 is sectionally delimited by the plurality of protrusions 4.1'/4.3' at its outer circumferential side 2.1/3.1.

Figure 27:
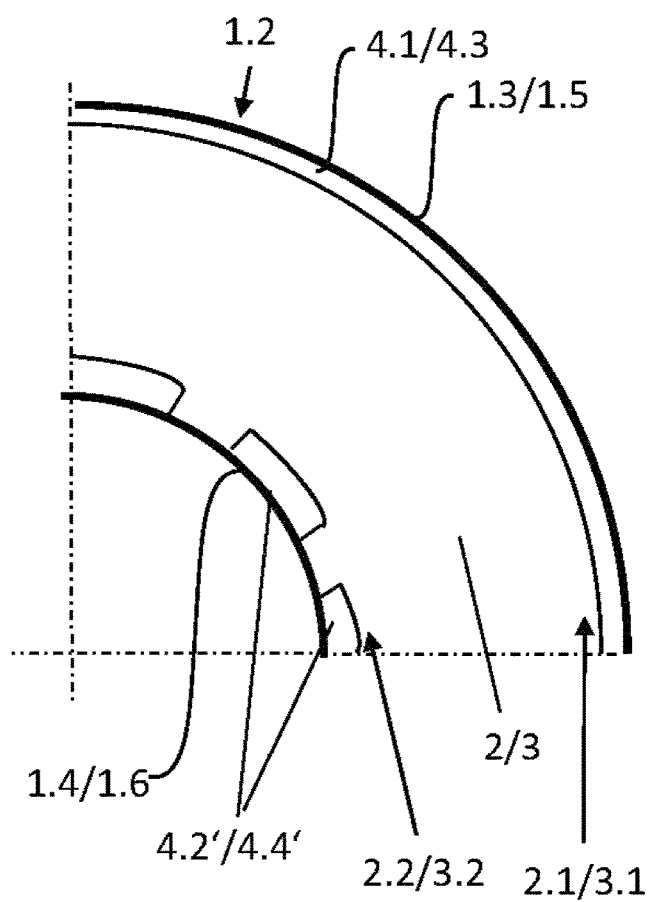

FIG. 27 shows an embodiment where a continuous protrusion 4.1/4.3 is provided at the outer side 2.1/3.1 of the friction surface 2/3, and intermitted protrusions 4.2'/4.4' are arranged at the inner side 2.2/3.2 of the friction surface 2/3.

Figure 28:
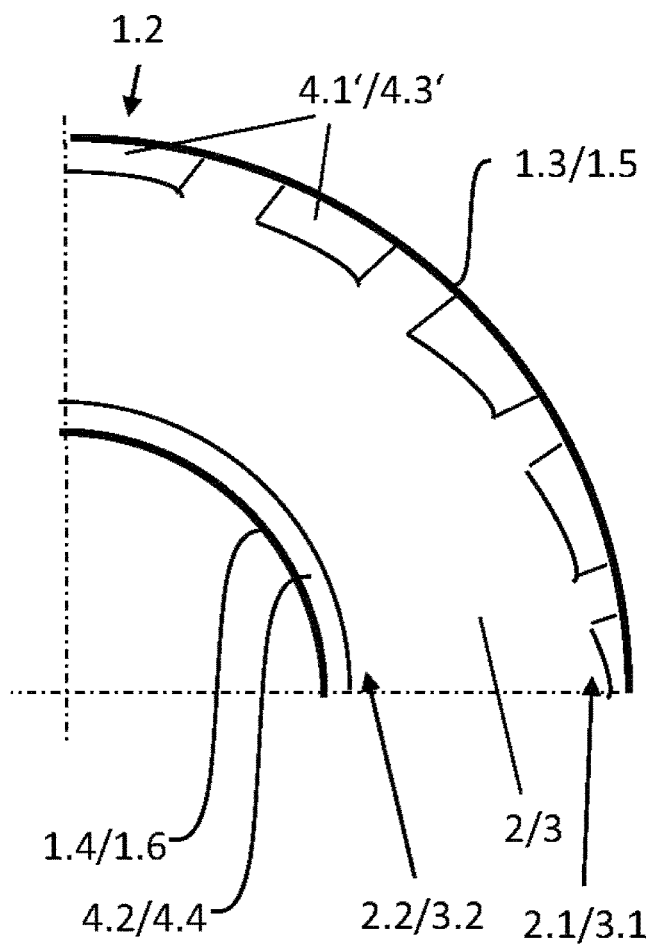

FIG. 28 shows an embodiment where a continuous protrusion 4.2/4.4 is provided at the inner side 2.2/3.2 of the friction surface 2/3, and intermitted protrusions 4.1'/4.3' are arranged at the outer side 2.1/3.1 of the friction surface 2/3.

LIST OF REFERENCE NUMERALS 1 brake disk
1.1 hub
1.2 friction ring
1.3 first outer circumferential edge of the friction ring
1.4 first inner circumferential edge of the friction ring
1.5 second outer circumferential edge of the friction ring
1.6 second inner circumferential edge of the friction ring
2 first friction surface (outer friction surface)
2.1 first outer circumferential side
2.2 first inner circumferential side
3 second friction surface (inner friction surface)
3.1 second outer circumferential side
3.2 second inner circumferential side
4.1, 4.2, 4.3
4.4, 4.1', 4.2' protrusions
5.1, 5.2, 5.3,
5.4 rising section of the protrusion
6.1, 6.2, 6.3,
6.4 flat section of the protrusion
7 first brake pad (outer brake pad)
8 second brake pad (inner brake pad)
9 caliper
9.1 caliper finger
9.2 piston

The invention claimed is:

1. A brake disk for a disk brake system, having at least one friction surface, which is at least sectionally delimited by at least one protrusion, protruding from the at least one friction surface, at an outer circumferential side and/or at an inner circumferential side of the at least one friction surface,
wherein at least one of the at least one protrusion includes a rising section adjoining the respective friction surface, the rising section being curved.

2. A brake system for a vehicle comprising the brake disk according to claim 1, and at least one brake pad configured for engaging with the at least one friction surface.

3. The brake system according to claim 2, wherein a distance between an edge of the at least one brake pad and the at least one protrusion is 0.3 mm to 2 mm.

4. The brake system according to claim 2, further comprising a caliper, wherein at least one of the at least one protrusion is provided at a first friction surface facing outward, a first brake pad that is configured to engage with said first friction surface being held by a caliper finger of the caliper.

5. The brake disk according to claim 1, wherein the at least one protrusion having the rising section includes a flat section adjoining the rising section, the flat section being parallel to the friction surface.

6. The brake disk according to claim 5, wherein the flat section extends over 0.5 mm to 3 mm in a radial direction.

7. The brake disk according to claim 1,
wherein a first protrusion is provided at the outer circumferential side of the at least one friction surface, and a second protrusion is provided at the inner circumferential side of the at least one friction surface, and
wherein the at least one friction surface comprises a first friction surface that is configured to face outward when mounted within a vehicle.

8. The brake disk according to claim 1,
wherein the at least one friction surface comprises a first friction surface and a second friction surface, and
wherein a first protrusion is provided at the outer circumferential side of the first friction surface, and a third protrusion is provided at the outer circumferential side of the second friction surface.

9. The brake disk according to claim 1, wherein at least one of the at least one protrusion extends along an entirety of a circumference of the respective friction surface.

10. The brake disk according to claim 1, wherein the at least one protrusion includes a plurality of protrusions that are intermittently arranged, such that one of an inner circumferential side of the at least one protrusion or an outer circumferential side of the at least one protrusion is sectionally delimited by the plurality of protrusions.

11. The brake disk according to claim 1, wherein the rising section extends over 1 mm to 5 mm in a radial direction.

12. The brake disk according to claim 1, wherein at least one of the at least one protrusion protrudes by 1 mm to 5 mm from the respective friction surface.

13. The brake disk according to claim 1, wherein at least one of the at least one protrusion is confined to a region extending radially at 1 mm to 8 mm from an inner circumferential edge and/or an outer circumferential edge of a friction ring of the brake disk.

14. The brake disk according to claim 1, wherein the brake disk is comprises one of:
a ventilated disk having holes in the at least one friction surface, or
a non-ventilated disk comprising a solid disk.

15. The brake disk according to claim 1,
wherein the brake disk is made from one of a grey-cast material or a ceramic, or
wherein the brake disk comprises a coating.

16. The brake disk according to claim 1, wherein the rising section has a radius of curvature of 2 mm to 5 mm.

17. The brake disk according to claim 1, wherein the rising section is flat, the rising section being at an angle of 5 degrees to 30 degrees with respect to the respective friction surface.

* * * * *